(12) United States Patent
Arquie et al.

(10) Patent No.: US 6,833,850 B1
(45) Date of Patent: Dec. 21, 2004

(54) METHOD FOR SIMPLIFYING DISPLAY OF COMPLEX NETWORK CONNECTIONS THROUGH PARTIAL OVERLAP OF CONNECTIONS IN DISPLAYED SEGMENTS

(75) Inventors: Louis Arquie, Cupertino, CA (US); Larry L. Cornett, Livermore, CA (US)

(73) Assignee: SANavigator, Inc., Broomfield, CO (US)

( * ) Notice: Subject to any disclaimer, the term of this patent is extended or adjusted under 35 U.S.C. 154(b) by 666 days.

(21) Appl. No.: 09/823,726

(22) Filed: Mar. 30, 2001

Related U.S. Application Data
(60) Provisional application No. 60/228,547, filed on Aug. 28, 2000.

(51) Int. Cl.[7] .............................. G06F 3/00; G06F 3/14
(52) U.S. Cl. ...................... 345/734; 345/810; 345/835; 345/853; 345/969; 709/223
(58) Field of Search ................................. 345/441, 442, 345/734, 736, 738, 764, 765, 767, 810, 821, 835, 845, 853, 969; 709/223, 224

(56) References Cited

U.S. PATENT DOCUMENTS

| | | | |
|---|---|---|---|
| 5,276,789 A | | 1/1994 | Besaw et al. |
| 5,278,951 A | | 1/1994 | Camacho et al. |
| 5,408,603 A | * | 4/1995 | Van de Lavoir et al. ... 345/763 |
| 5,751,965 A | * | 5/1998 | Mayo et al. ................. 709/224 |
| 5,910,803 A | | 6/1999 | Grau et al. |
| 6,014,715 A | | 1/2000 | Stoevhase |
| 6,067,093 A | | 5/2000 | Grau et al. |
| 6,072,490 A | * | 6/2000 | Bates et al. .................. 345/821 |
| 6,078,324 A | | 6/2000 | Phathayakorn et al. |
| 6,078,739 A | * | 6/2000 | Paterson et al. ................ 703/6 |
| 6,154,212 A | * | 11/2000 | Eick et al. .................... 345/848 |
| 6,229,538 B1 | * | 5/2001 | McIntyre et al. ............ 345/734 |
| 6,295,575 B1 | * | 9/2001 | Blumenau et al. .............. 711/5 |
| 6,331,983 B1 | * | 12/2001 | Haggerty et al. ............ 370/400 |
| 6,369,819 B1 | | 4/2002 | Pitkow et al. |
| 6,374,293 B1 | * | 4/2002 | Dev et al. .................... 709/220 |

* cited by examiner

*Primary Examiner*—X. L. Bautista
(74) *Attorney, Agent, or Firm*—Hensley Kim & Edgington, LLC

(57) ABSTRACT

A method for simplifying display of complex network connections in a user interface. The method includes displaying a network topology display having multiple interconnected nodes. The nodes, such as network hubs or switches, are connected to one or more of the other nodes via line segments or connection paths. The segments are intentionally overlapped to simplify the visual representation of the network topology display. To remove ambiguity as to which nodes are connected to each other, the method includes using distinguishing connector segments to connect the orthogonal portions of the line segments or connection paths. The connector segments are configured to indicate which nodes are connected and may include any polygonal structure. In one embodiment, the connector segments comprise rounded corner connectors between two orthogonal segments that effectively indicate connected node pairs.

32 Claims, 4 Drawing Sheets

METHOD FOR SIMPLIFYING DISPLAY OF COMPLEX NETWORK CONNECTIONS THROUGH PARTIAL OVERLAP OF CONNECTIONS IN DISPLAYED SEGMENTS

CROSS-REFERENCES TO RELATED APPLICATIONS

This application is related to, and claims priority from, U.S. Provisional Patent Application Ser. No. 60/228,547, filed Aug. 28, 2000, entitled "METHOD FOR SIMPLIFYING DISPLAY OF COMPLEX NETWORK CONNECTIONS THROUGH PARTIAL OVERLAP OF CONNECTIONS IN DISPLAYED SEGMENTS," the disclosure of which is hereby incorporated by reference in its entirety.

BACKGROUND OF THE INVENTION

The present invention relates to systems and methods for displaying the topology of a network, such as a storage area network (SAN), and more particularly to systems and methods for simplifying the display of complex network connections by partially overlapping displayed connection segments in a network topology display.

One goal of graph drawing theory, and the implementations of that theory to display network topologies on computer screens, is to avoid any overlap of connections between nodes on the display. This seems to avoid the ambiguous nature of overlapping, or partially overlapping, connections, and works well for simple network topologies. However, such a display becomes very confusing for large topologies: the user is presented with a complex web of tangled connections. Above a certain level of network complexity, it becomes difficult for the user to make much sense of the display and to determine which nodes are connected.

Accordingly, it is desirable to provide systems and methods for simpifying a network topology display to allow the user to easily identify and determine which nodes are connected.

SUMMARY OF THE INVENTION

The present invention provides systems and methods for displaying the connections of a network topology in a simplified manner so as to avoid the web of tangled connections that other methods would display. In addition, the user is provided with means to easily identify and determine the connections between network nodes.

According to an aspect of the invention, a computer-implemented method is provided for simplifying a network topology display having multiple connections between network nodes. The method typically comprises displaying a node representing a component in a network, said node having two connections to two other nodes in the network, and displaying first and second connection paths, each representing one of the two connections with the two other nodes, wherein the first connection path includes first and second orthogonal segments and a curved segment joining the first and second segments in a continuous manner, and wherein the first segment overlaps with a portion of the second connection path.

According to another aspect of the present invention, a computer-implemented method is provided for simplifying a network topology display having multiple connections between network nodes. The method typically comprises displaying a node representing a component in a network, said node having two connections to two other nodes in the network, displaying first and second connection paths, each representing one of the two connections with the two other nodes, wherein portions of the first and second connection paths overlap, and highlighting the first connection path in response to a user selection of the first connection path.

According to yet another aspect of the present invention, a computer-implemented method is provided for simplifying a network topology display having multiple connections between network nodes. The method typically comprises displaying a node representing a component in a network, said node having two or more connections to two or more other nodes in the network, displaying two or more connection paths, each representing one of the connections with the other nodes, wherein portions of a first displayed connection path overlaps with a portion of a second displayed connection path, and highlighting the displayed connection paths for all connections to the displayed node in response to a user indication.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
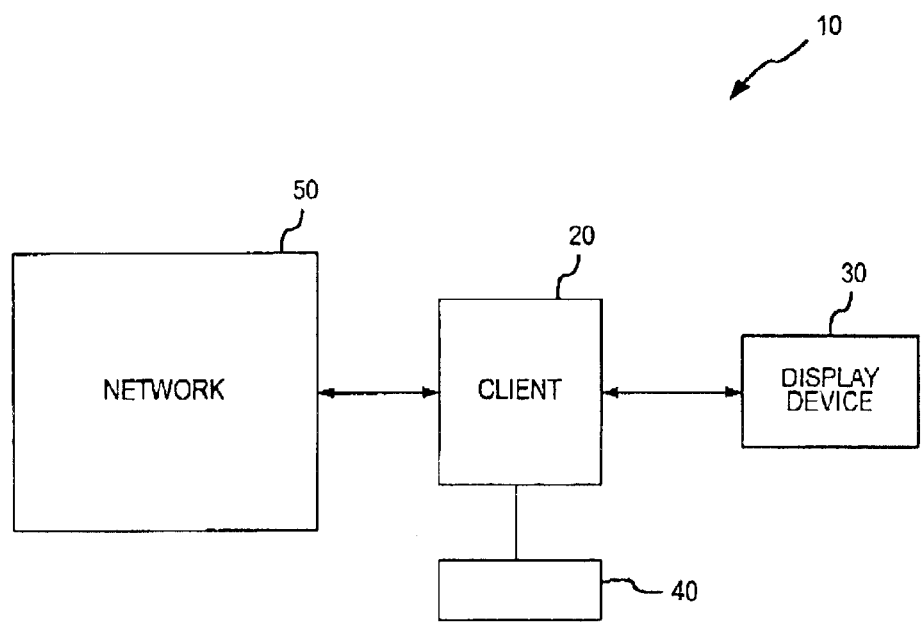
FIG. 1 illustrates an exemplary display system for implementing a network topology display according to the present invention.

FIG. 1 illustrates an exemplary display system 10 suitable for implementing a network topology display according to the present invention. Display system 10 includes client device 20, coupled to, or including display device 30 and user interface device 40. Client device 20 could be a desktop personal computer, workstation, laptop computer, or any other computing device including components capable of interfacing directly or indirectly with the desired network(s) 50 for which a topology display is desired. Network 50 can be a storage area network (SAN), such as a Fibre-channel-based or SCSI-based SAN, or any other type of network. Each client 20 typically runs an application program allowing a user of client 20 to analyze the topology of the network(s) as will be discussed in more detail below. Each client device 20 also typically includes one or more user interface devices 40, such as a keyboard, a mouse, touchscreen, pen or the like, for interacting with a graphical user interface (GUI) provided by the application program on a display device 30. In general, display device 30 is any device capable of rendering a topology display of the network(s) 50 including, for example, a monitor screen, LCD display, printer, etc.

The application program typically includes computer code run using a central processing unit such as an Intel Pentium processor or the like. Computer code for operating and configuring client 20 as described herein is preferably stored on a hard disk, but the entire program code, or portions thereof, may also be stored in any other memory device such as a ROM or RAM, or provided on any media capable of storing program code, such as a compact disk (CD) medium, a floppy disk, or the like. Additionally, the entire program code, or portions thereof may be downloaded from a software source to client 20 over the Internet as is well known, or transmitted over any other conventional network connection as is well known, e.g., extranet, VPN, LAN, etc., using any communication medium and protocols (e.g., TCP/IP, HTTP, HTTPS, Ethernet, etc.) as are well known. Additionally, portions of the program code may be downloaded or provided to client device 20 and executed on client device 20. In one embodiment, portions of the program code are executed simultaneously at different locations (e.g., one or more clients 20 are connected to one or more servers) and the communication between the different parts is transmitted over the Internet or other network connection/medium.

Figure 2:
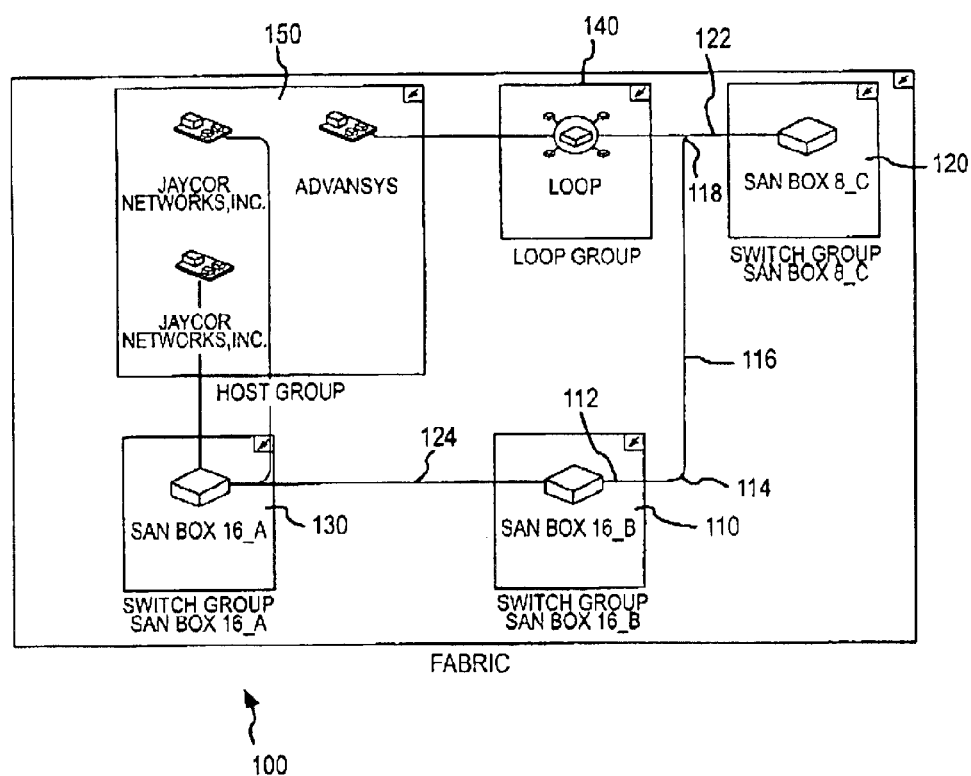
FIG. 2 illustrates an example of a network topology display including curved, or rounded, connection segments joining orthogonal connection segments of connection paths according to an embodiment of the present invention.

FIG. 2 illustrates a portion of a network topology display according to the present invention. In FIG. 2, screen display 100 includes multiple interconnected nodes. Nodes include any type of network device or network communication device, such as network hubs, servers, switches, client computers, routers, etc., or any group of interconnected devices. As shown in FIG. 2, for example, loop group node 140 represents one or more network devices interconnected over a network communication loop, e.g., a Fibre-channel FC-AL loop or other loop or network medium. Loop Group node 140 is displayed as a single node rather than as the separate individual device nodes making up the group loop node to simplify the display for the viewer. Similarly, each of displayed Switch group nodes 110, 120, and 130 represent a network switch device and any devices connected locally thereto. Host group node 150 is displayed in an "expanded" mode whereby individual devices in the group are displayed as individual nodes within the host group node box 150. Application Ser. No. 09/539,350, entitled "Methods for Displaying Nodes of a Network Using a Multilayer Representation," which is hereby incorporated by reference in its entirety for all purposes, provides an example of techniques for identifying network devices, grouping the network devices into appropriate groups and displaying corresponding device and group nodes. The user may selectively expand and contract the group nodes using user input device 40 as desired. The term "node" will be used hereafter to refer to both device and group nodes to simplify the description.

As shown in FIG. 2, each node is generally connected to one or more other nodes by lines or connection paths, each including one or more segments. For example, the connection path 124 connecting switch node 110 to switch node 130 includes one segment, whereas the connection path between switch node 110 and switch node 120 includes multiple segments. Each connection path between nodes in the display is preferably broken into one or more orthogonal segments. Preferably, as shown, the connection paths include horizontal and vertical segments as this provides the user with a clean display interface since oblique segments are known to be difficult to display on a computer or monitor screen, e.g., due to aliasing. In addition, as shown, multiple connection paths coupled to a node from the same general direction are overlapped intentionally to simplify the visual representation of the network. For example, segment 122 of the connection path between switch nodes 110 and 120 overlaps with a portion of the connection path between loop node 140 and switch node 120. Such overlapping is particularly useful in complex networks including many, many connections.

According to one embodiment of the present invention, distinguishing connector segments, e.g., rounded corner connectors, are advantageously used to connect orthogonal segments so as to remove some of the ambiguity arising from the nature of orthogonal drawings. As shown in FIG. 2, for example, in the connection path between switch node 110 and switch node 120, rounded corner connector 114 connects segment 112 and segment 116, and connector 118 connects segment 116 to segment 122. Such distinguishing connector segments provide a sense of direction to the connection path and are particularly useful in the case where connection segments overlap. For example, if connector 118 were not present, a true orthogonal connection between segment 116 and 122 would make it very difficult for the viewer to determine whether switch node 110 was connected to loop node 140 or switch node 120. With the distinguishing connector 118, the viewer can easily determine that switch node 110 is connected to switch node 120 and not to loop node 140 as shown in FIG. 2.

It should be appreciated that distinguishing connector segments according to the present invention, e.g., rounded corner segments 114 and 118, need not be rounded, but may include any polygonal structure. For example, connector 118 might include a single line connecting to both segment 116 and segment 122 at a 45° angle. Such a single line connector would indicate the connection between switch node 110 and switch node 120. Alternatively, connector 118 includes two or more polygonal segments (e.g, each segment connecting to the next at an angle less than 180°) with two segments connecting to segments 116 and 122 at any angle other than 90° so as to distinguish the connectivity of the connection path connecting to switch node 110.

Figure 3:
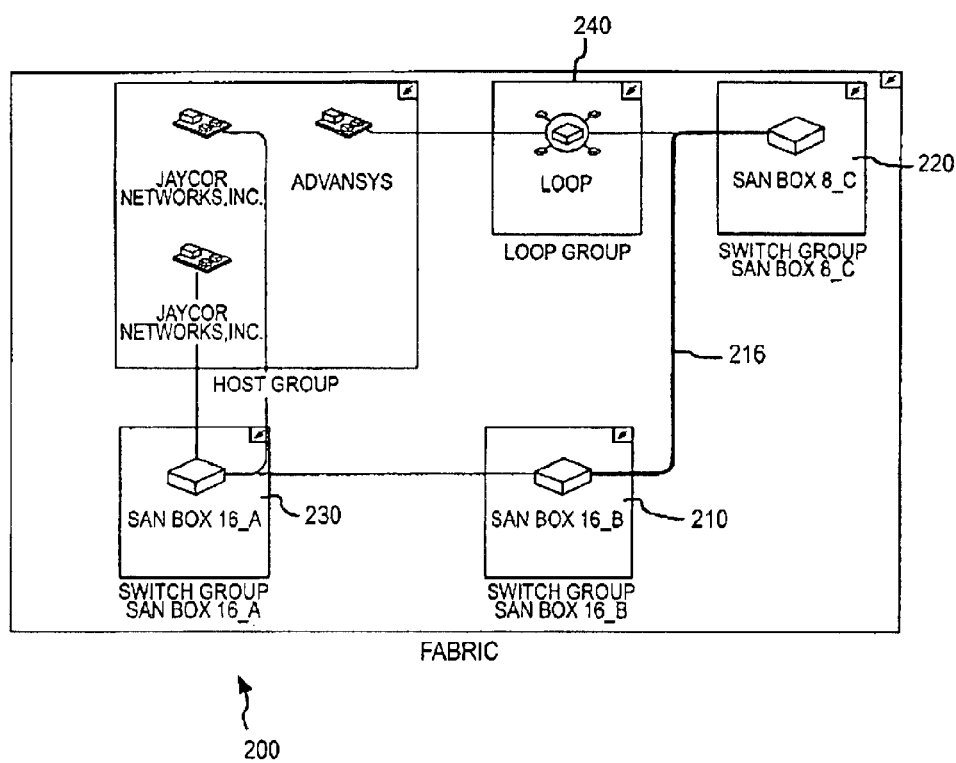
FIG. 3 illustrates an example of a highlighted connection path in a network topology display according to an embodiment of the present invention.

In another embodiment, the user is able to selectively highlight a connection by "mousing over" a line or other portion of the display, or otherwise selecting the connection. FIG. 3 illustrates a portion of a network topology display including a highlighted connection path according to an embodiment of the present invention. As shown, screen display 200 includes multiple nodes and connection paths similar to FIG. 2. Connection path 216 connecting switch node 210 and switch node 220 is shown in a "highlighted" state responsive to a user selection of the connection between those nodes. In one embodiment, the user may highlight a desired connection path by "mousing over" the connection path using the user input device 40. Alternatively, the user may select a particular connection, e.g., from a menu or list of one or more connections for a particular node or from a list of all connections for all nodes, and the corresponding connection path is highlighted. Preferably the connection path is highlighted by emboldening. (e.g., increasing the thickness) the connection path as shown in FIG. 3, however, the selected connection path may be displayed in a different color, may be made to flash (e.g., on and off, alternating colors, etc.) or the selected connection path may be displayed as a dotted line or a thinner line. Generally, any method that distinguishes the selected connection path may be used. Such highlighting is particularly useful in cases where connection paths overlap partially.

Figure 4:
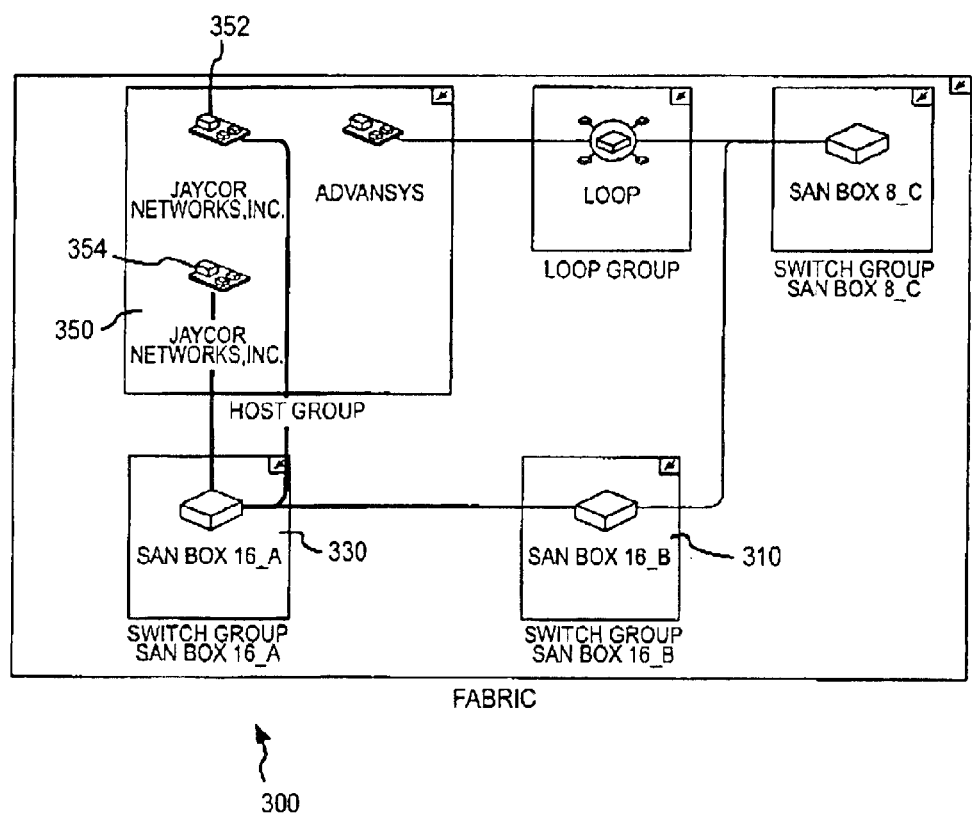
FIG. 4 illustrates an example of highlighted connection paths for a particular node in a network topology display according to an embodiment of the present invention.

In another embodiment, the user is provided with a menu item that allows the user to selectively highlight all the connections of a node simultaneously. FIG. 4 illustrates a portion of a network topology display 300 including multiple highlighted connection paths according to an embodiment of the present invention. As shown, screen display 300 includes multiple nodes and connection paths similar to FIGS. 2 and 3. All connection paths connecting switch node 330 with one or more other nodes i.e., nodes 352, 354 in host group 350 and nodes in switch group 310, are shown in a "highlighted" state responsive to a user selection of all the connections for switch node 330. As above, highlighting of the connection paths can include emboldening, thinning, coloration, flashing, etc. In alternate embodiments, the user can select all connections of a particular node by clicking on the node, or selecting the node from a list of nodes. In general any form of a command that the user can execute on a node to identify all the links connected to that node can be used.

Other embodiments include presenting the user with a list of network connections which is synchronized with the topology display in such a way that selecting one connection in the topology display or in the list display causes the same connection in the other display to be selected and/or highlighted.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of simplifying a network topology display having multiple connections between network nodes, comprising:
    displaying a node representing a component in a network, said node having two connections to two other nodes in the network; and
    displaying first and second connection paths, each representing one of the two connections with the two other nodes, wherein the first connection path includes first and second orthogonal segments and a first curved segment joining the first and second segments in a continuous manner to indicate connection of the displayed node and a first one of the two other nodes, wherein the second connection path includes first and second orthogonal segments and a second curved segment joining the first and second segments in a continuous manner to indicate connection of the displayed node and a second one of the two other nodes, and wherein the first segment of the first connection path overlaps with a portion the first segment of the second connection path such that the overlapped portion of the first segment of the second connection path is not visible in the network topology display.

2. The computer-implemented method of claim 1, wherein the first segment is a horizontal segment and wherein the second segment is a vertical segment.

3. The computer-implemented method of claim 2, wherein the horizontal segment of the first connection path overlaps with a portion of a horizontal segment of the second connection path.

4. The computer-implemented method of claim 2, wherein the vertical segment of the first connection path overlaps with a portion of a vertical segment of the second connection path.

5. The computer-implemented method of claim 1, wherein the first segment is connected to the displayed node, and wherein the first segment overlaps with a portion of a segment of the second connection path.

6. The computer-implemented method of claim 5, further comprising displaying a second node representing a second component in the network, wherein the second segment is connected to the second displayed node.

7. The computer-implemented method of claim 5, wherein the first connection path further includes a third segment orthogonal to the second segment, and a second curved segment joining the second segment to the third segment in a continuous manner.

8. The computer-implemented method of claim 7, further comprising displaying a second node representing a second component in the network, wherein the third segment is connected to the second displayed node.

9. The computer-implemented method of claim 1, further comprising highlighting the first connection path in response to a user selection of the first connection path.

10. The computer-implemented method of claim 9, wherein the step of highlighting includes increasing the thickness of the first connection path.

11. The computer-implemented method of claim 9, wherein the step of highlighting includes changing the color of the first connection path.

12. The computer-implemented method of claim 9, wherein the user selection is performed by the user using a computer mouse.

13. The computer-implemented method of claim 9, wherein the user selection is performed by the user selecting a first connection associated with the first connection path from a list of network connections.

14. The computer-implemented method of claim 1, wherein the displayed node represents one of a switch group and a host group.

15. The computer-implemented method of claim 1, further comprising highlighting the connection paths for all connections to the displayed node in response to a user indication.

16. The computer-implemented method of claim 15, wherein the step of highlighting includes increasing the thickness of the highlighted connection paths.

17. The computer-implemented method of claim 15, wherein the step of highlighting includes changing the colors of the highlighted connection paths.

18. The computer-implemented method of claim 15, wherein the user indication is input by the user using a computer mouse.

19. The computer-implemented method of claim 15, wherein the user indication includes a selection by the user from a menu of one or more options.

20. The computer-implemented method of claim 1, wherein the network is a storage area network (SAN).

21. A computer-implemented method of simplifying a network topology display having multiple connections between network nodes, comprising:
    displaying a node representing a component in a network, said node having two connections to two other nodes in the network;
    displaying first and second connection paths, each representing one of the two connections with the two other nodes, wherein portions of the first and second connection paths overlap such that only one of the first and second connection paths is visible in network topology display in the overlapping portions; and
    highlighting the first connection path in response to a user selection of the first connection path.

22. The computer-implemented method of claim 21, wherein highlighting includes increasing the thickness of the first connection path.

23. The computer-implemented method of claim 21, wherein highlighting includes changing the color of the first connection path.

24. The computer-implemented method of claim 21, wherein the user selection is performed by the user using a computer mouse.

25. The computer-implemented method of claim 21, wherein the user selection is performed by the user selecting a first connection associated with the first connection path from a list of network connections.

26. A computer-implemented method of simplifying a network topology display having multiple connections between network nodes, comprising:

displaying a node representing a component in a network, said node having two or more connections to two or more other nodes in the network;

displaying two or more connection paths, each representing one of the Connections with the other nodes, wherein portions of a first displayed connection path overlaps with a portion of a second displayed connection path such that only one of the first and second connection paths is visible in network topology display in the overlapping positions; and highlighting the displayed connection paths for all connections to the displayed node in response to a user indication.

27. The computer-implemented method of claim 26, wherein highlighting includes increasing the thickness of the highlighted connection paths.

28. The computer-implemented method of claim 26, wherein highlighting includes changing the color of the highlighted connection paths.

29. The computer-implemented method of claim 26, wherein the user indication is performed by the user using a computer mouse.

30. The computer-implemented method of claim 26, wherein the user indication includes a selection by the user from a menu of one or more options.

31. A computer-implemented method of simplifying a network topology display having multiple connections between network nodes, comprising:

displaying a node representing a component in a network, said node having two connections to two other nodes in the network; and displaying first and second connection paths, each representing one of the two connections with the two other nodes, wherein the first connection path includes first and second orthogonal segments and a distinguishing segment joining the first and second segments in a continuous manner, the distinguishing segment being configured to indicate connectivity between the displayed node and only one of the two other nodes by providing a sense of direction to the first connection path between the displayed node and the one of the two other nodes, and wherein the first segment overlaps with a portion of the second connection path.

32. The computer-implemented method of claim 31, wherein the distinguishing segment includes two or more polygonal portions.

* * * * *